(12) United States Patent
Zeitlin

(10) Patent No.: US 8,590,877 B2
(45) Date of Patent: Nov. 26, 2013

(54) CORRALLING UTENSIL WITH ASSOCIATED CUTTING BOARD

(76) Inventor: Eric S. Zeitlin, Baldwin, NY (US)

( * ) Notice: Subject to any disclaimer, the term of this patent is extended or adjusted under 35 U.S.C. 154(b) by 279 days.

(21) Appl. No.: 12/106,991

(22) Filed: Apr. 21, 2008

(65) Prior Publication Data

US 2009/0260168 A1    Oct. 22, 2009

(51) Int. Cl.
*B23Q 3/00*    (2006.01)

(52) U.S. Cl.
USPC ................................. 269/302.1; 269/289 R

(58) Field of Classification Search
USPC .......................................... 269/289 R, 302.1
See application file for complete search history.

(56) References Cited

U.S. PATENT DOCUMENTS

| | | | |
|---|---|---|---|
| 4,447,051 A | 5/1984 | Price | |
| 5,203,548 A | 4/1993 | Sanders | |
| D440,472 S | 4/2001 | Paschal et al. | |
| 6,460,841 B1 * | 10/2002 | Durr | 269/289 R |
| 6,733,056 B2 | 5/2004 | Daniele | |
| 7,637,154 B1 * | 12/2009 | Robbins | 73/429 |
| 2005/0039607 A1 | 2/2005 | Comfield | |
| 2008/0203747 A1 | 8/2008 | Stenglein | |
| 2011/0041349 A1 | 2/2011 | Zimmerman et al. | |

FOREIGN PATENT DOCUMENTS

JP        2006130278        5/2006

\* cited by examiner

*Primary Examiner* — Lee D Wilson
*Assistant Examiner* — Shantese McDonald
(74) *Attorney, Agent, or Firm* — Patent Law Offices of Rick Martin, P.C.

(57) ABSTRACT

A corralling utensil with associated cutting board (10). The corralling utensil (40) quickly, easily and accurately gathers and moves food or other items around and off the cutting board (20) to another location, and may be used separately from the cutting board (20) on other surfaces such as tables, counters, butcher blocks and chopping mats. The corralling utensil (40) may be removably stored in, on, or to a designated area of the associated cutting board (20) for convenient storage and use.

9 Claims, 12 Drawing Sheets

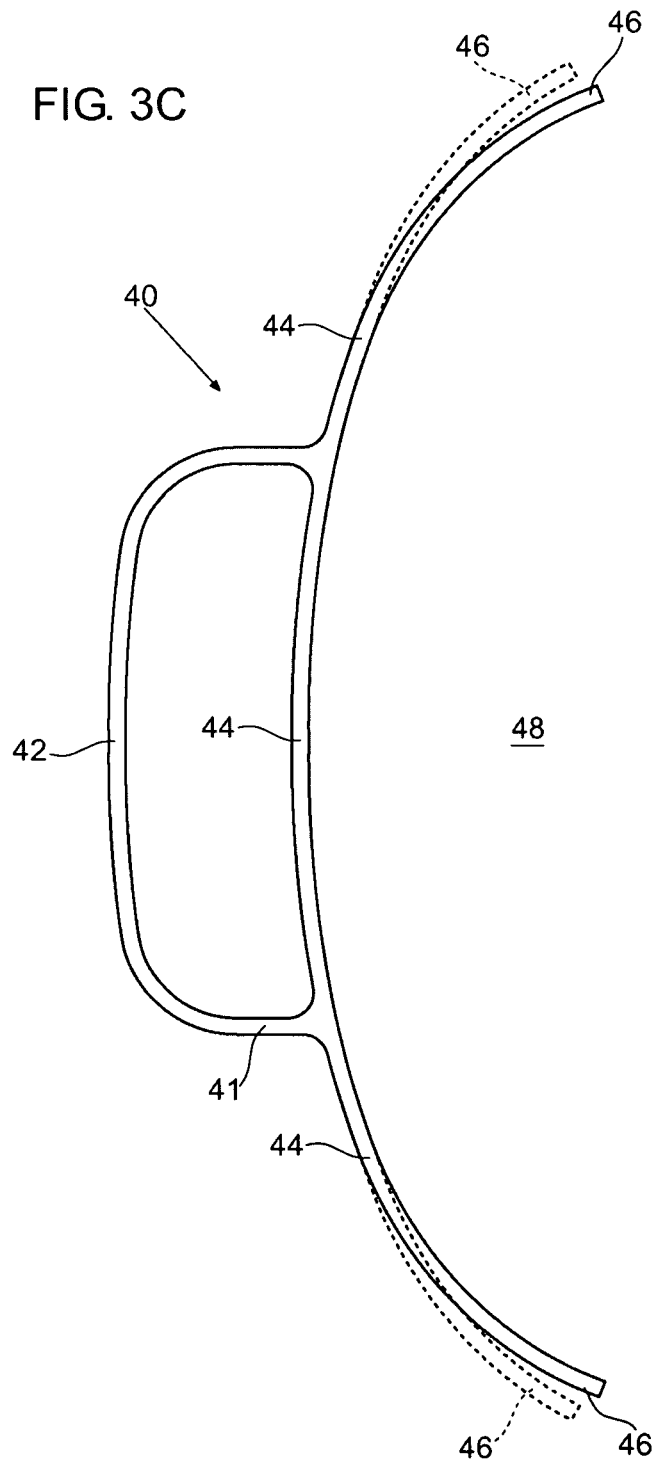

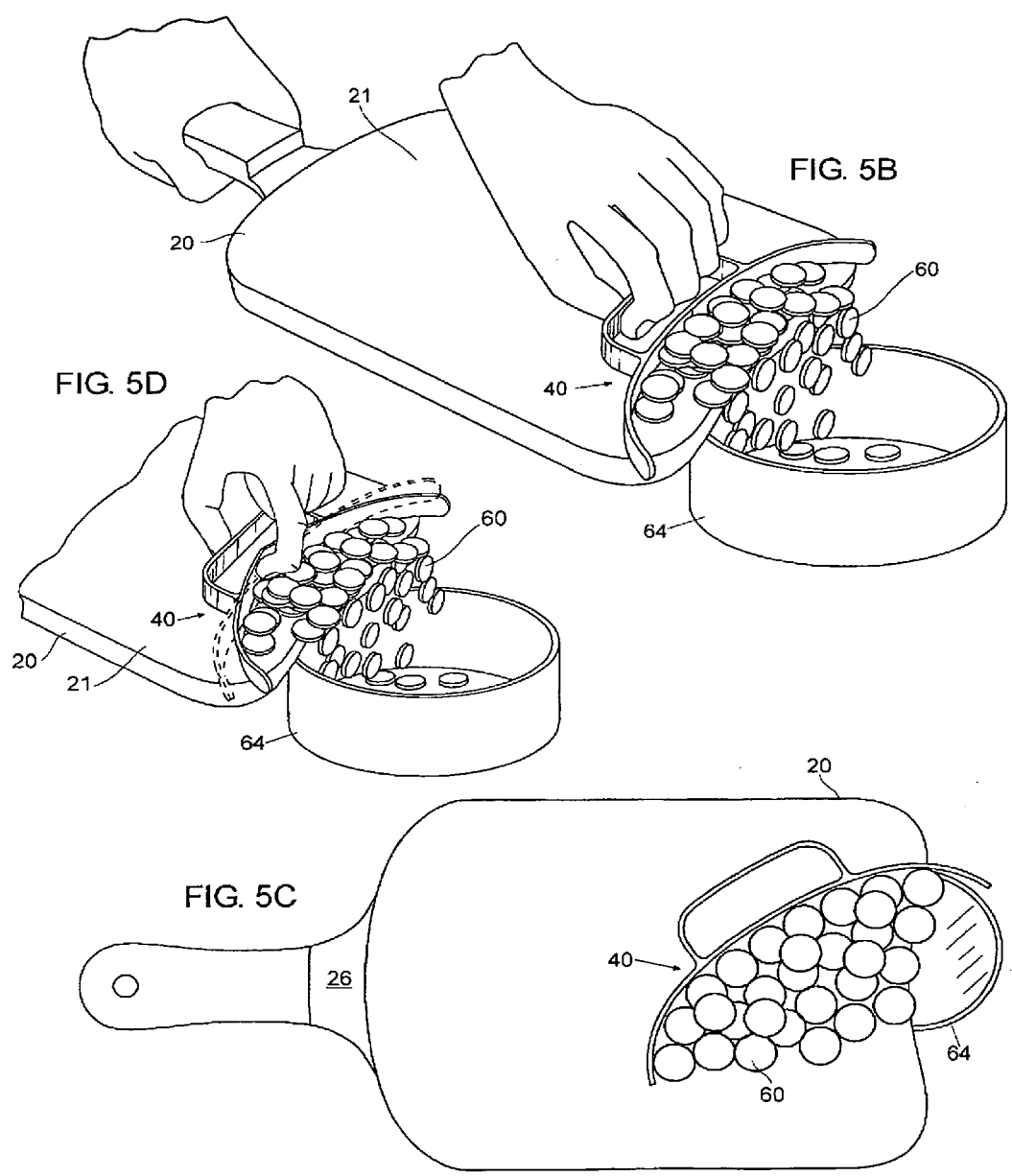

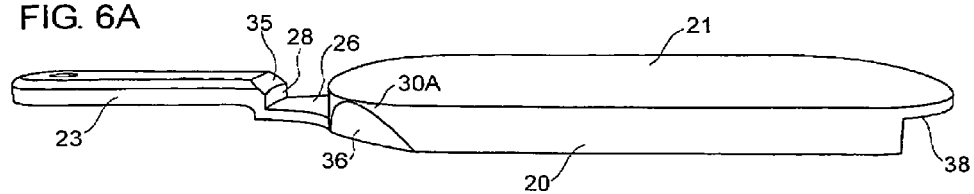
FIG. 6A
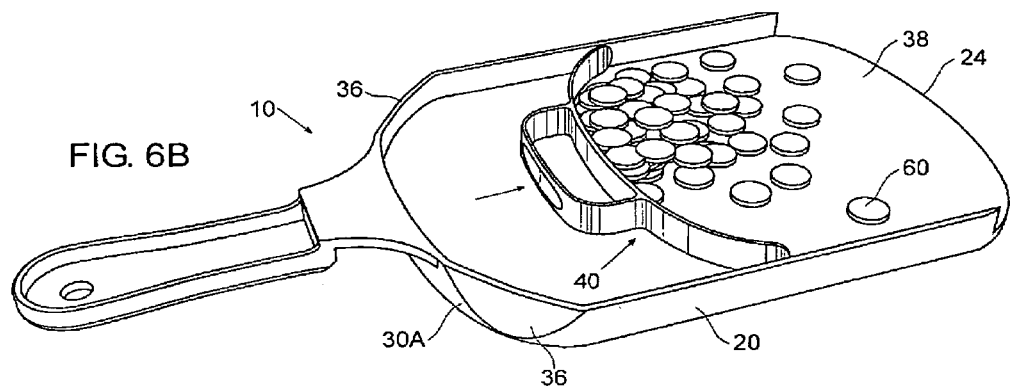
FIG. 6B
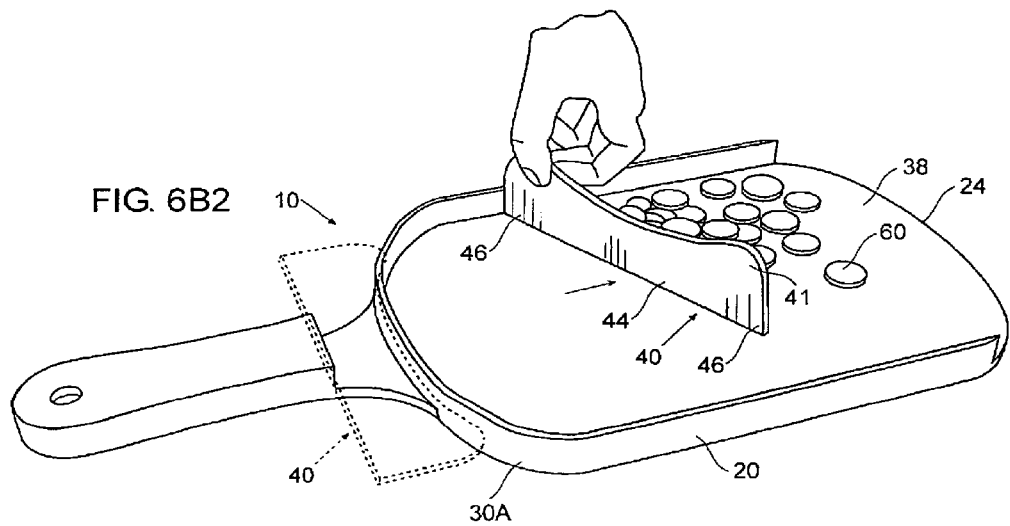
FIG. 6B2

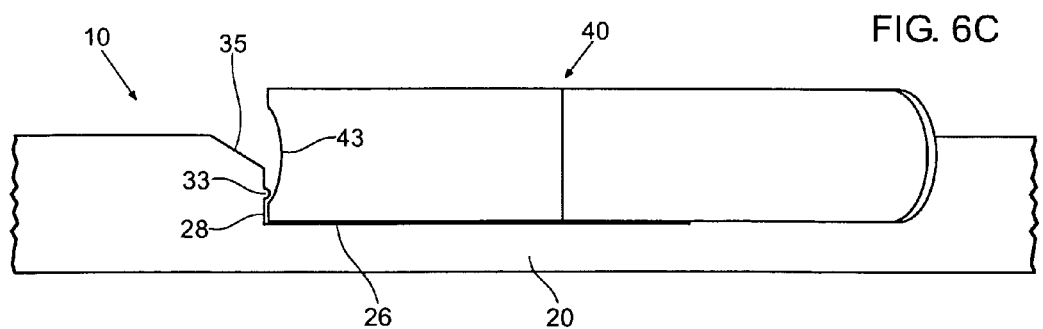

CORRALLING UTENSIL WITH ASSOCIATED CUTTING BOARD

CROSS REFERENCE TO RELATED APPLICATIONS

N/A

FEDERALLY SPONSORED RESEARCH

N/A

SEQUENCE LISTING OR PROGRAM

N/A

BACKGROUND OF THE INVENTION

1. Field of Invention

The present invention relates in general to kitchen utensils, and more specifically to a corralling utensil with an associated cutting board in which the corralling utensil may be removably stored. The corralling utensil is used to quickly, easily and accurately gather and move food or other items around and off the cutting board or other surface.

2. Prior Art

After cutting food into smaller pieces on a cutting board, the cut food is typically moved around and off of the board into a container, such as a cooking pot, storage container, or dish. Often a kitchen knife is used to move the food. However, as a pile of cut food is pushed with the blade, pieces of food dissipate along the flat blade instead of staying in a complete pile. Additionally, blade edges are typically curved, making it unsuitable for effective scraping of a flat cutting board, necessitating multiple scraping movements in multiple directions to effectively move cut food with the knife, with some of the food ending up where it is not desired, for example on a table, countertop, stove, and floor, resulting in wasted food, time, and effort.

There are several products that address this problem. Some are scoops that carry cut food to a container, for example U.S. Pat. No. 6,733,056, to Daniele. However, they require the user to scrape food into the device, and often require scraping of the inside of the scoop to remove food remnants stuck inside it. A similar product is the Crumb Scraper, which waiters use to remove crumbs from tables. It is vertically concave, and horizontally straight, therefore it would not work well if used to remove cut food from a cutting board, since the food would likely dissipate along and off the length of the product instead of gathering into a pile for efficient moving. Japanese patent publication JP2006130278 to Shunichi describes a squeegee that is attached to a kitchen knife to move cut vegetables. Unfortunately, this device must be attached to the kitchen knife before use, it may fall off the knife during use, and it will likely get in the way of cutting food.

Other products attempt to solve the problem by creating an area on or within a cutting board for funneling cut food into a container, by providing walls around the board or providing means for folding the board. An example of the former is U.S. Pat. No. 4,446,051 to Price. An example of the latter is U.S. Pat. No. 5,203,548 to Sanders. Unfortunately, not all of the cut food on these boards will fall off the board by the force of gravity only; the remainder still needs to be removed from the board, which may be difficult to do with these designs. In the case of walls surrounding the surface of a board, as in Price, the blade of a large kitchen knife may not fit within the area between the walls. In the case of folding boards, such as Sanders, it may be difficult for the user to hold the board unfolded with only one hand, while the other scrapes the board with the edge of their knife blade. Either way, a knife may be necessary to complete the process, with the resulting problems mentioned above.

Finally, U.S. Pat. No. D440,462 to Paschal, et al, shows a cutting board with what appears to be a sliding food pusher and removable measuring cup. It appears to work by the user pushing forward on the sliding food pusher to move cut food along the board into the measuring cup, which is pulled out for use. There are several drawbacks to this design. First, several things could cause the pusher to bind and not slide smoothly: Food may get caught between the pusher and the board during use, the board may shrink, expand, warp, or twist over time, and the user may not push forward evenly on the middle of the pusher. Further, only the top side of the board can be used for cutting, and any food that ends up in the grooves will not be pushed off the board. Additionally, the user may need to put their fingers at the front of the sliding pusher in order to grasp it, thereby contacting the food being pushed. Also, because the pusher can only move straight forward, the user must push food off the board at the front end of the board only, but some users prefer to push food off the sides of their boards. Another disadvantage of the pusher being confined to a straight path is that it does not provide means for the user to control the movement of food; if there is a large pile of food on the board, some of it may inadvertently dissipate along the length of the pusher and fall off the sides of the board as the pusher is slid forward, since the pusher cannot be rotated to focus the cut food into a container. Finally, the user does not have the option of moving only part of a pile of food, or only one pile when there is more than one on the board.

3. Objects and Advantages

Accordingly, several objects and advantages of the present invention are:

(a) to provide a corralling utensil that facilitates faster, easier, and cleaner food preparation by providing means for more efficient and accurate gathering and moving of cut food around and off a cutting board or other surface, helping to prevent food from inadvertently falling off the board, and providing means for getting food into a small container by allowing the user to rotate the corralling utensil to more accurately focus the food;

(b) to provide a corralling utensil that allows the user to push food off any part of a cutting board, allows them to move part of a pile of food or a single pile when more than one is on the board, and helps keep their hands and fingers clean;

(c) to provide a cutting board with means for removably storing the corralling utensil, whereby fast and convenient access to the corralling utensil during food preparation is provided, the utensil is less likely to get lost or misplaced, and users can maintain their present cutting method and style.

Further objects and advantages will become apparent from a consideration of the ensuing description and drawings.

SUMMARY

In accordance with the present invention, a corralling utensil comprising a retaining wall with means for holding and moving the retaining wall is provided, along with an associated cutting board with means for the removable storage of the corralling utensil. The corralling utensil is used to quickly, easily and accurately gather and move food around and off the cutting board and other surfaces.

Various embodiments are presented showing some of the many configurations the corralling utensil and associated cutting board may take while maintaining the spirit of the present invention.

DRAWINGS

Figures

A more complete understanding of the method and apparatus of the present invention may be acquired by reference to the following Detailed Description when taken in conjunction with the accompanying Drawings wherein:

FIG. 3C shows a top view of the corralling utensil, illustrating arms 46 bending backwards for storage in the cutting board.

FIG. 5B shows the present invention in use, with the corralling utensil being used to gather and move cut food off of the cutting board into a container.

FIG. 5C shows a top view of the corralling utensil rotated while moving forward, illustrating how a user can focus food into a small container.

FIG. 5D shows the corralling utensil being squeezed by the user while moving it forward, illustrating how a user can focus food into a small container.

Figure 2:
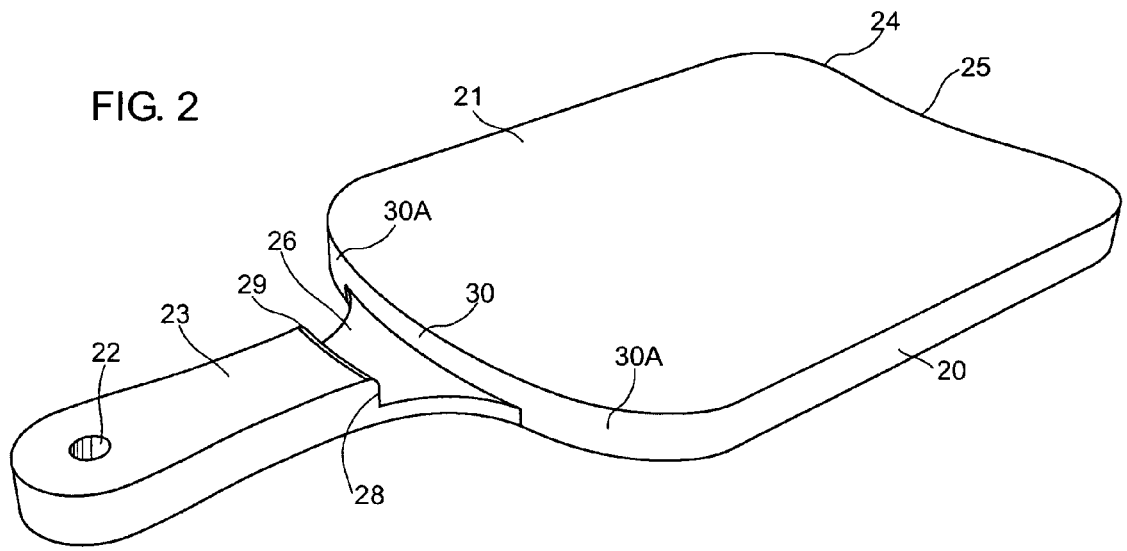
FIG. 2 shows the preferred embodiment of the cutting board.

FIG. 6B2 shows a perspective view of an alternate version of the present invention of FIG. 6A, in use with a differently shaped corralling utensil.

FIGS. 6C-6F show side views of the present invention illustrating various methods for temporarily securing the corralling utensil into the groove of the cutting board.

Figure 6D:
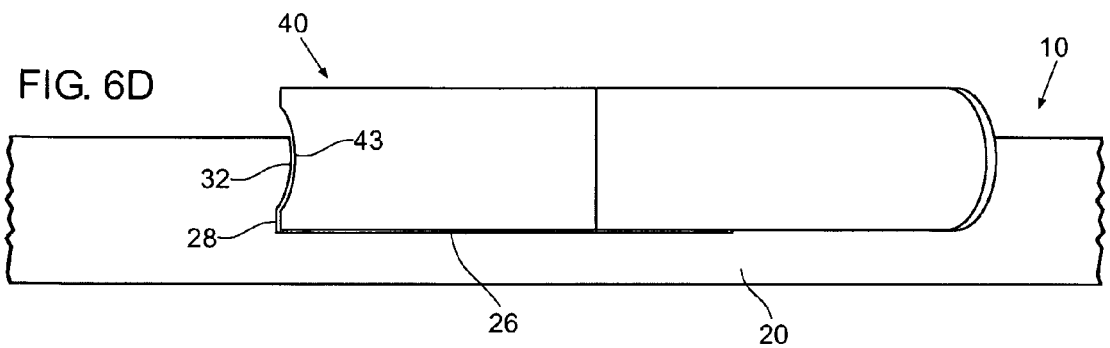
FIG. 6A shows an injection molded version of the cutting board of the present invention.
FIG. 6B shows a bottom perspective view of the present invention of FIG. 6A, in use.
Figure 6E:
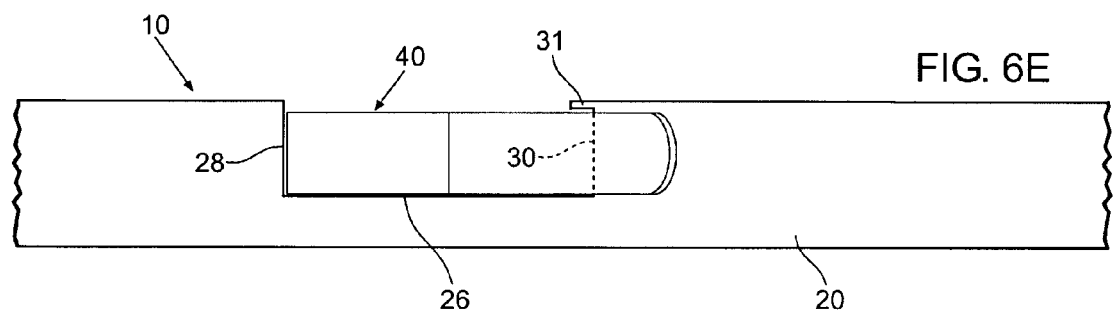
Figure 6F:
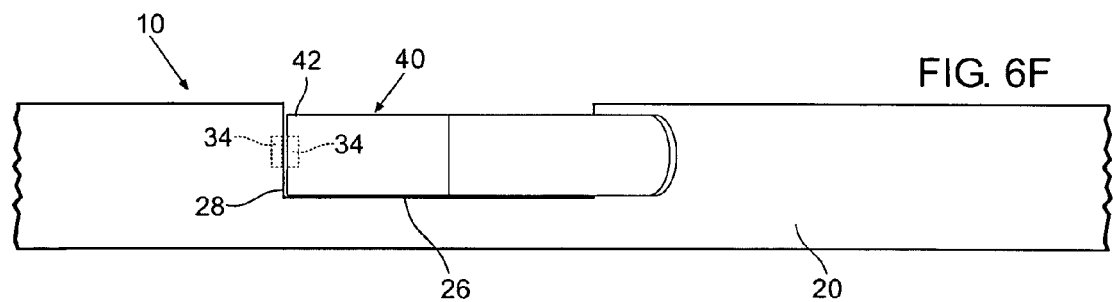
Figure 6H:
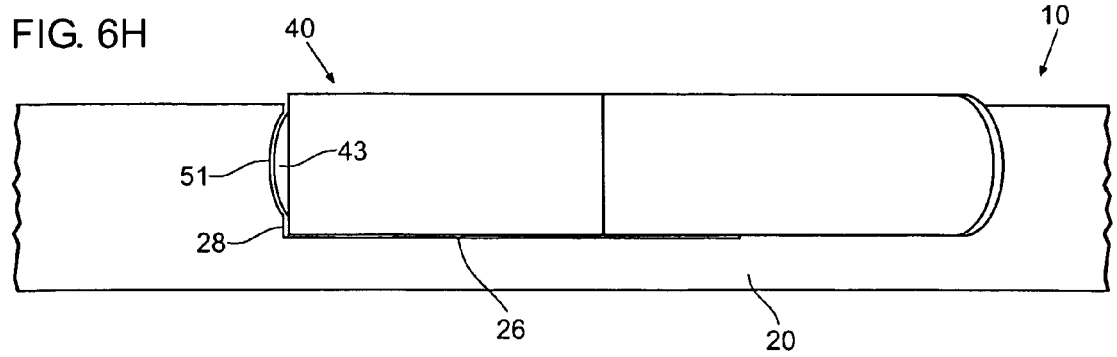
Figure 6G:
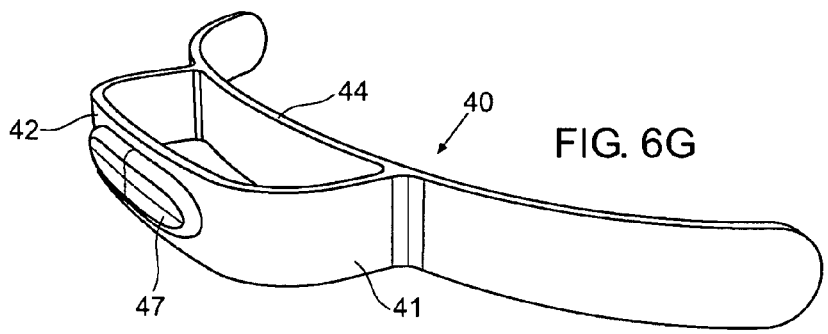

FIG. 6G shows the corralling utensil with a protuberance 47 on the handgrip 42.

FIG. 6H shows a side view of the corralling utensil of FIG. 6G secured in a cutting board with a matching indentation 51 on the back groove wall.

Figure 7A:
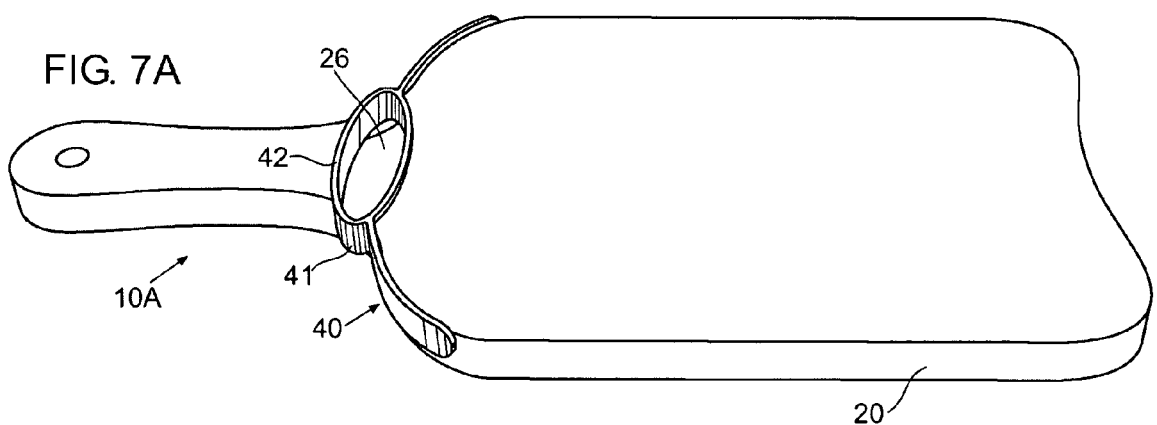

FIG. 7A shows alternative embodiment A of the present invention.

Figure 7B:
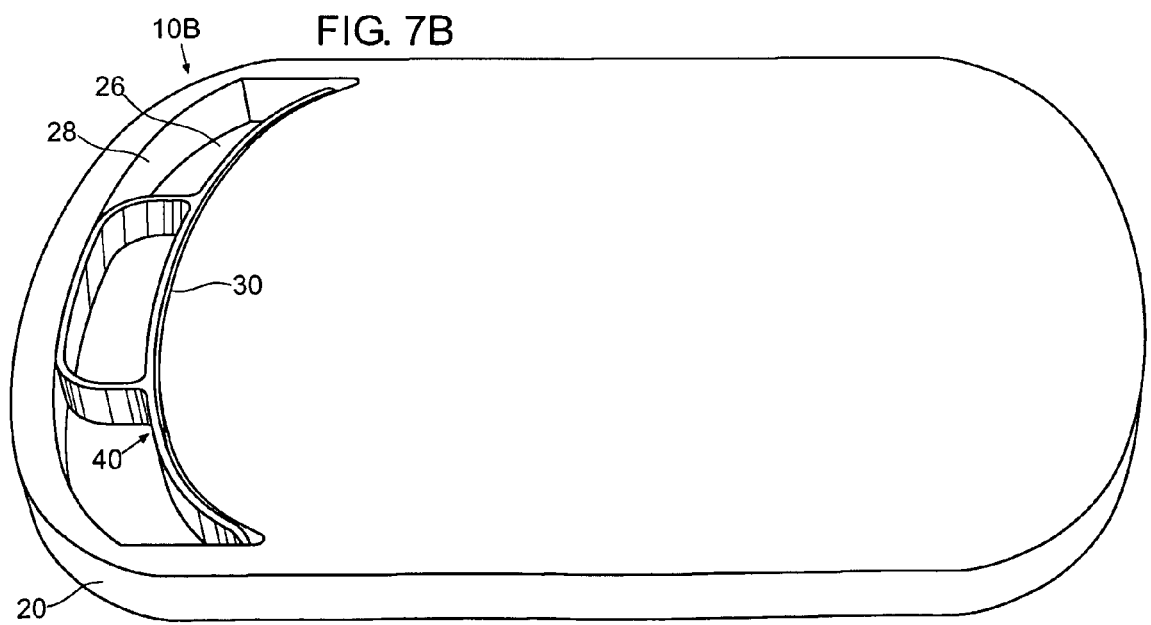

FIG. 7B shows alternative embodiment B of the present invention.

Figure 7C:
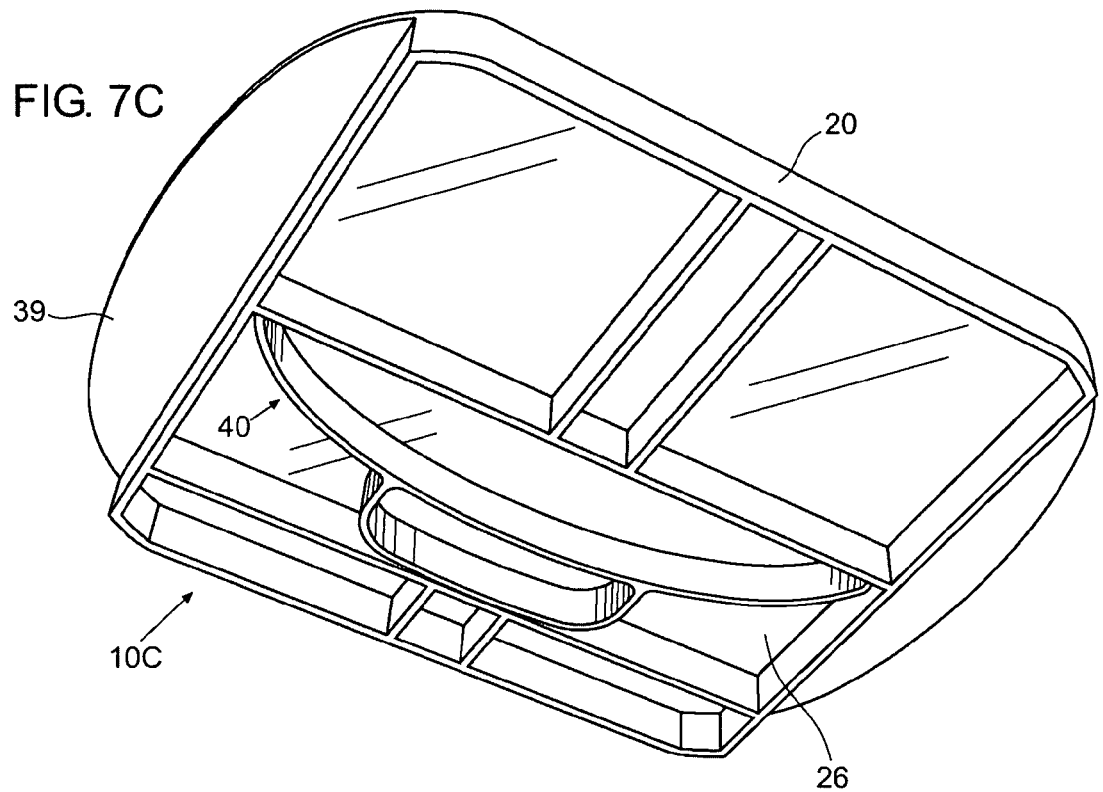

FIG. 7C shows alternative embodiment C of the present invention.

Figure 7D:
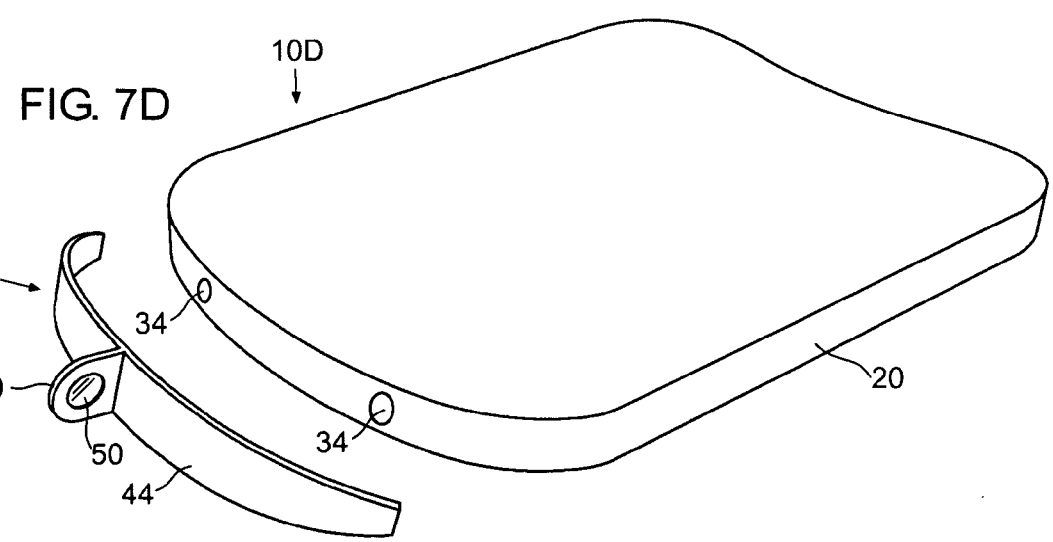

FIG. 7D shows alternative embodiment D of the present invention.

Figure 8A:
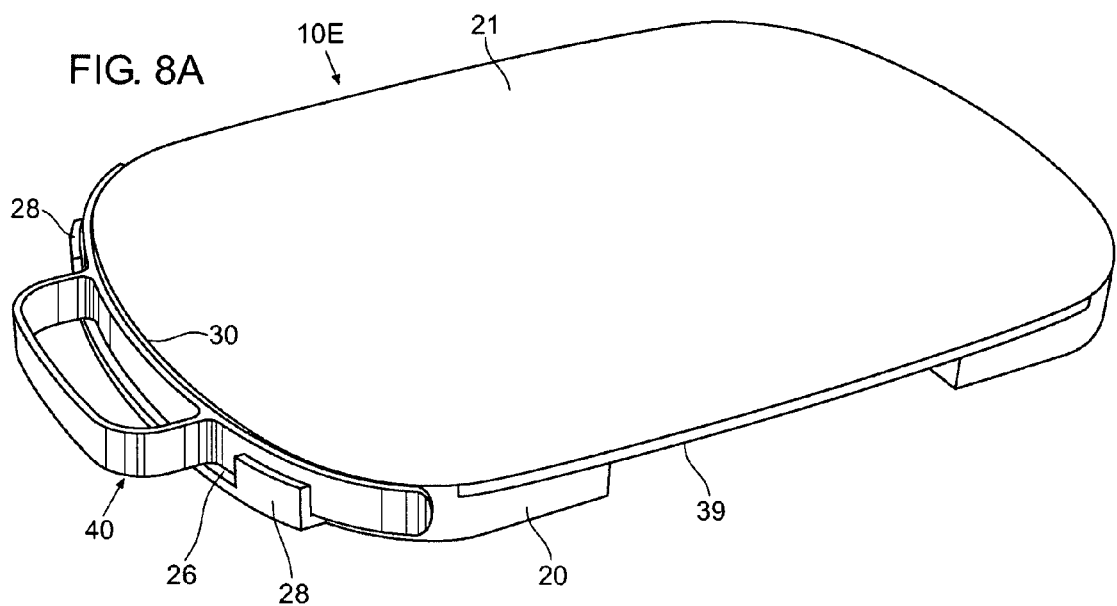

FIG. 8A shows alternative embodiment E of the present invention.

Figure 8B:
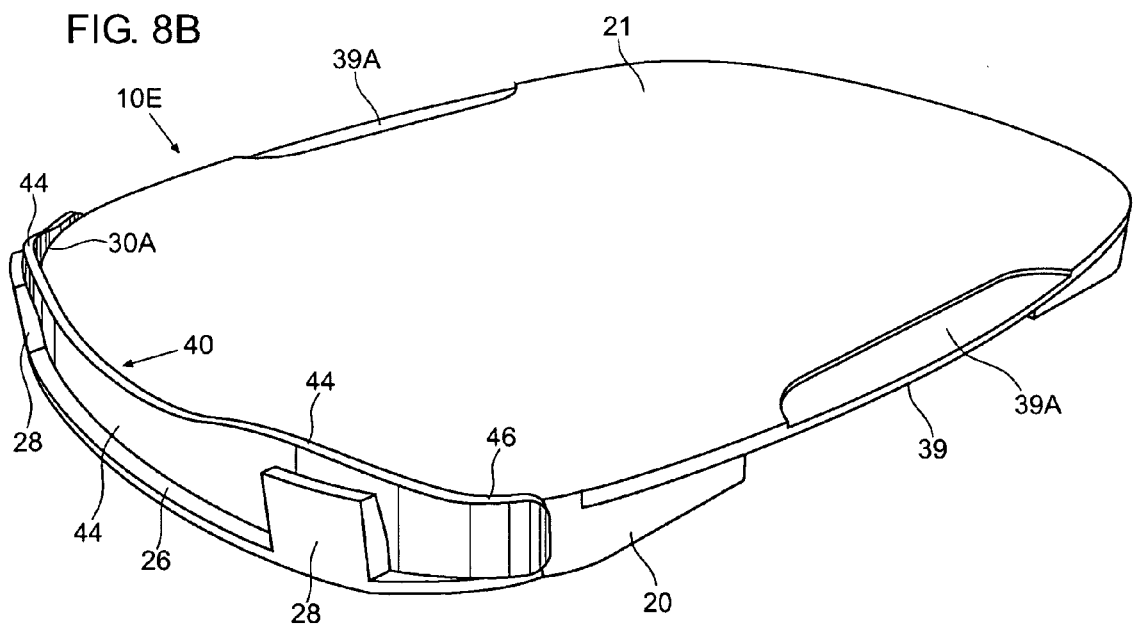

FIG. 8B shows alternative embodiment E of FIG. 8A with an alternative corralling utensil.

Figure 8C:
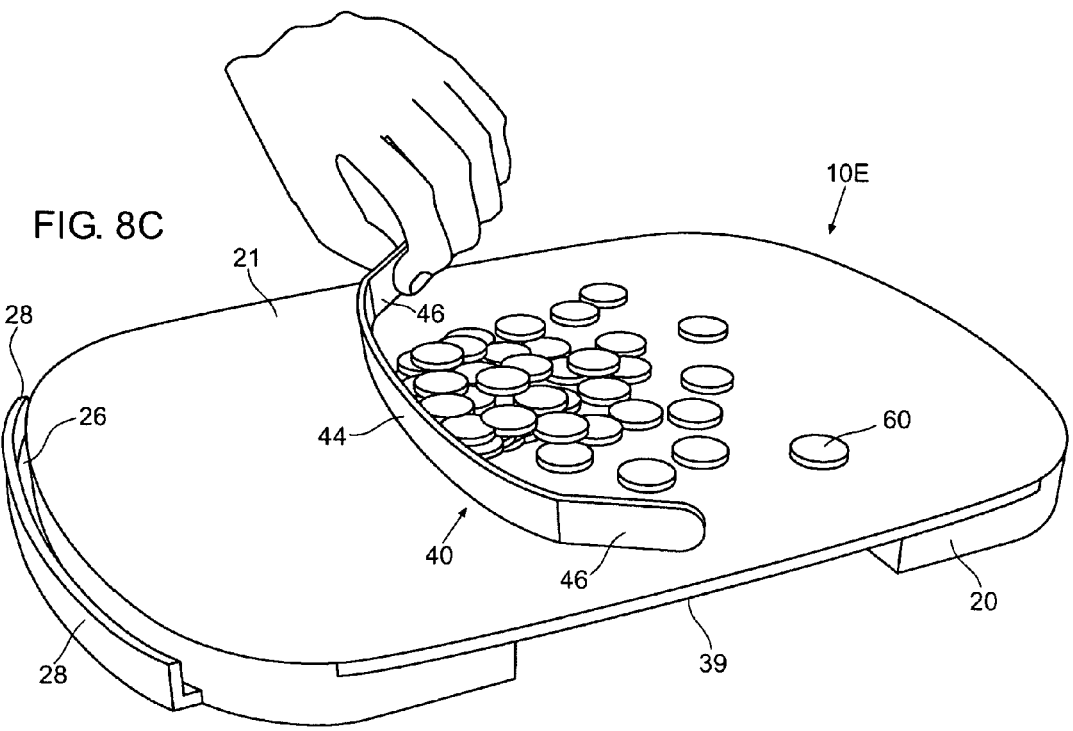

FIG. 8C shows an additional embodiment of alternate embodiment E in use.

Figure 8D:
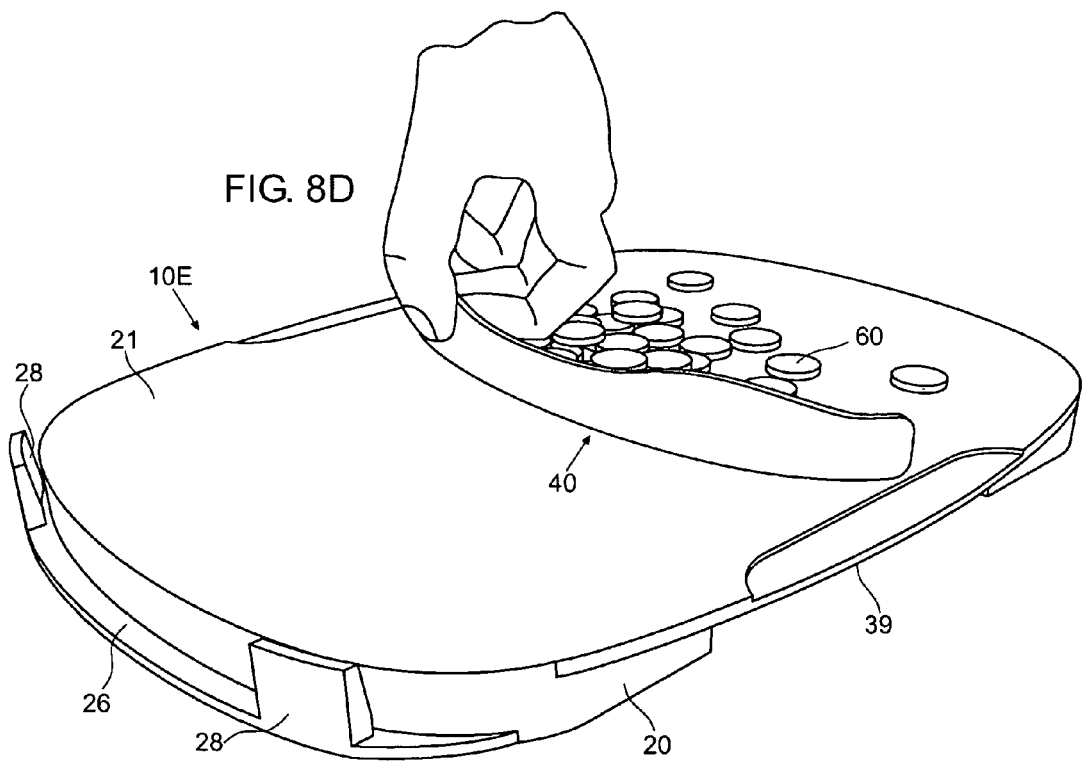

FIG. 8D shows alternative embodiment E of FIG. 8B in use.

DRAWINGS

Reference Numerals

10—Corralling Utensil with Associated Cutting Board
10A—Alternative Embodiment A
10B—Alternative Embodiment B
10C—Alternative Embodiment C
10D—Alternative Embodiment D
10E—Alternative Embodiment E
20—Cutting Board
21—Cutting Surface
22—Hanging Hole
23—Handhold for Cutting Board
24—Front End of Cutting Board
25—Front End Cutout
26—Groove for Storage of Corralling Utensil 40
28—Back Groove Wall
29—Rounded Top Edge of Back Groove Wall 28
30—Front Groove Wall
30A—Outer Front Groove Wall
31—Front Groove Wall Overhang
32—Back Groove Wall Protrusion
33—Locking Protrusion
34—Magnet
35—Chamfered Top Edge of Back Groove Wall 28
36—Indent on Outer Front Groove Walls 30A
38—Recessed Bottom Cutting Surface
39—Gripping Recess
39A—Thumb Groove over Gripping Recess 39
40—Corralling Utensil
41—Handle of Corralling Utensil
42—Handgrip of Handle 41
43—Furrow on Handgrip 42
44—Retaining Wall of Corralling Utensil
46—Arms of Retaining Wall 44
47—Protuberance on Handgrip 42
48—Gathering Area
49—Alternate Handle of Corralling Utensil
50—Dimple
51—Indentation on Back Groove Wall 28
60—Cut Food
64—Container

DETAILED DESCRIPTION

Preferred Embodiment—FIGS. 1A-4C

With reference now to the drawings, and in particular to FIGS. 1A-8D thereof, a novel corralling utensil with associated cutting board embodying the principles and concepts of the present invention and generally designated by the reference numeral 10 will be described. While the embodiments described herein are intended as an exemplary corralling utensil with associated cutting board for cutting, gathering, and transferring food articles, it will be appreciated by those skilled in the art that the present invention is not limited to food articles, and may be employed for use with other items.

Figure 1A:
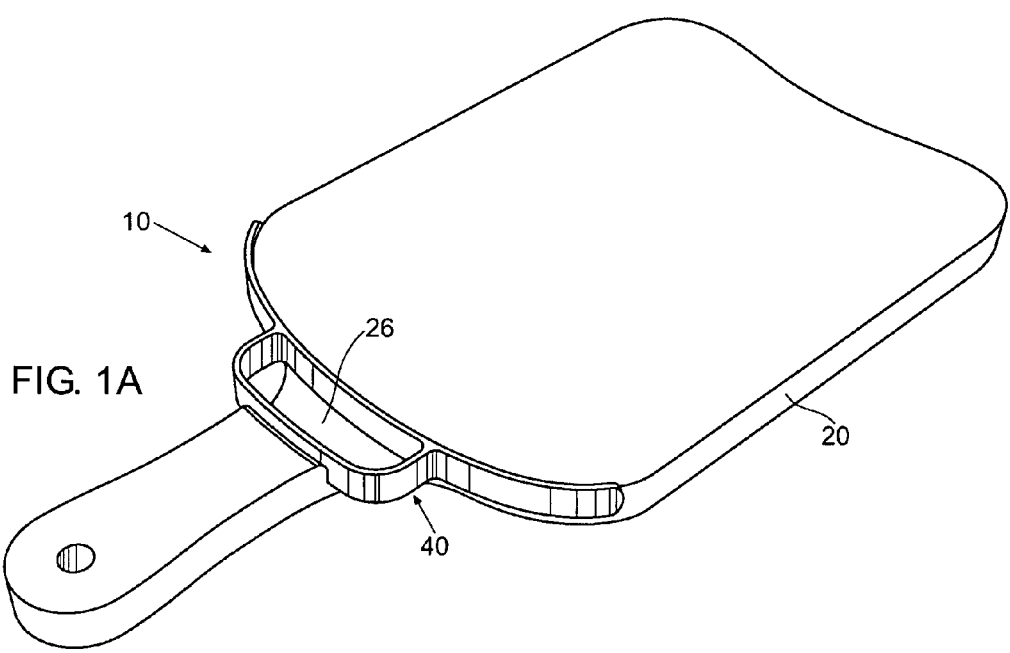
FIG. 1A is an illustration of the corralling utensil removably stored in the groove of the associated cutting board, in accordance with the present invention.

Referring now to FIGS. 1A-6H, a first embodiment of the present invention will be described in detail. FIG. 1A shows a perspective view of the Corralling Utensil with Associated Cutting Board 10, with corralling utensil 40 inserted and removably secured in groove 26 of cutting board 20, while FIG. 1B shows a top view of same, illustrating how corralling utensil 40 nests within groove 26.

Figure 1B:
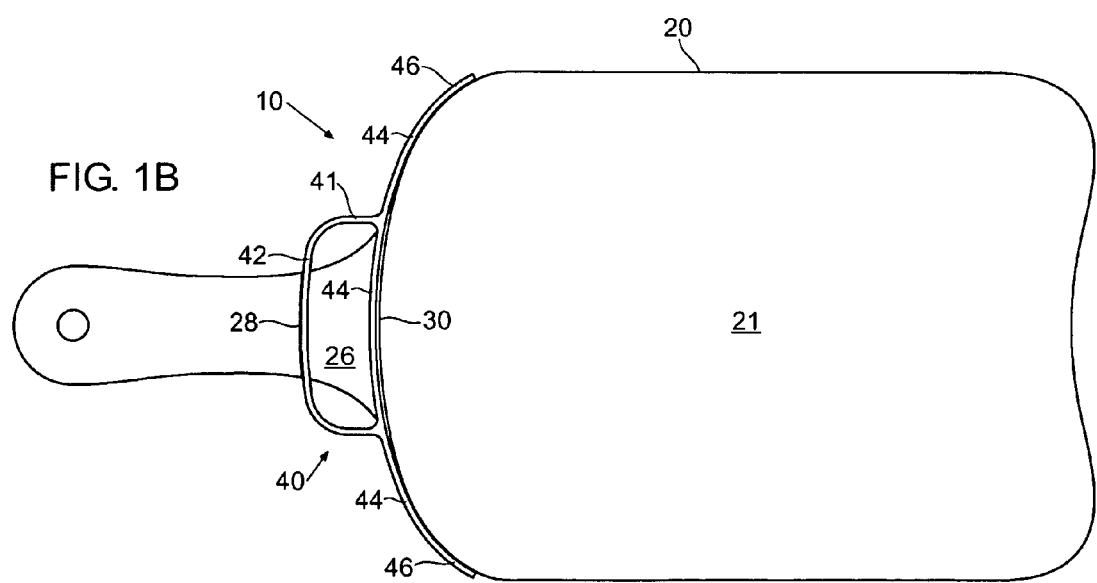
FIG. 1B shows a top view of the corralling utensil stored in the cutting board.

Cutting board 20 of the present invention is shown in FIG. 2 comprised of a generally flat board with a substantially flat cutting surface 21 and a handhold 23 with optional hanging hole 22 for hanging the board. Board 20 has a groove 26 formed therein, for removably receiving and accommodating corralling utensil 40. Groove 26 is delimited by back groove wall 28 and front groove wall 30. The top edge of back groove wall 28 is horizontally concave so that it generally matches the horizontally convex curve of the handgrip 42 of corralling utensil 40, as can be seen in FIG. 1B, but may be shaped differently to accommodate different designs of corralling utensil 40. Back groove wall 28 has an optional rounded top edge 29 which facilitates easier insertion and removal of corralling utensil 40 into groove 26. Front groove wall 30 is mostly convex, to generally match the horizontally concave curve of the retaining wall 44 of corralling utensil 40. The depth of groove 26 may vary, but should not be so deep as to compromise the integrity of board 20. The front end 24 of board 20 may be shaped in various configurations, for example it may be straight, angled, curved, convex, etc. In the preferred embodiment front end 24 has a concave cutout 25 which may facilitate more accuracy in moving food off the front end 24 into a container. Similarly, one or both sides of board 20 may have a concave or convex section. The distance between the outer surface of handgrip 42 and the outer surface of retaining wall 44 is less than the distance between back groove wall 28 and front groove wall 30, to allow the insertion of corralling utensil 40 into groove 26, even if there are food remnants remaining on retaining wall 44.

Figure 3A:
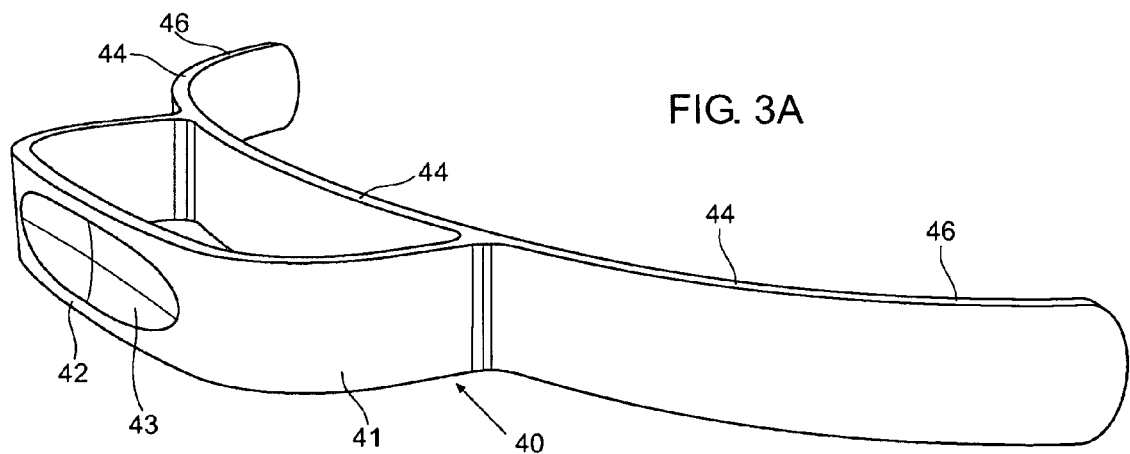
FIG. 3A shows the preferred embodiment of the corralling utensil of the present invention with optional furrow 43.
Figure 3B:
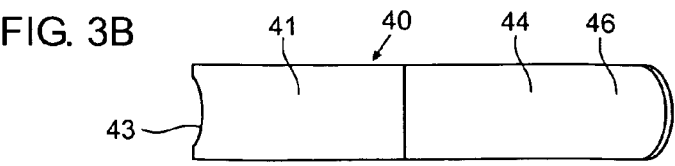
FIG. 3B shows a side view of the corralling utensil.

FIG. 3A shows corralling utensil 40, which is comprised of a mostly vertical retaining wall 44 that is horizontally bent inward, from a top view, here creating a concave shape, with a handle 41 attached to the opposite, convex side. The top and bottom of corralling utensil 40 are mostly flat, but may have beveled or rounded edges, and the top edge may be made not flat, if desired. Handle 41 has a handgrip 42 which is generally parallel to retaining wall 44. Handgrip 42 allows the user to use corralling utensil 40 without their fingers touching any cut food. This helps prevent contamination and possible ill health effects, especially if raw meat or seafood is being cut. FIGS. 3A and 3B, the latter showing a side view of corralling utensil 40, show handgrip 42 with an optional furrow 43 formed longitudinally in its outer surface, which helps to facilitate more secure gripping of handgrip 42. This is especially helpful if a user's fingers are covered in slippery food residue during food preparation. Furrow 43 may continue around the entire handle 41, if desired.

FIG. 3C shows a top view of corralling device 40 showing retaining wall 44 which is bent inward into a concave curve to facilitate a snug fit of corralling utensil 40 within groove 26. The curve of retaining wall 44 generally matches the corresponding curve of front groove wall 30, becoming gradually more concave as it moves outwards towards its outer ends, delineated as the arms 46 of retaining wall 44, whereby the curve of retaining wall 44 beyond handle 41 has a higher curvature than the corresponding outer curve 30A of front groove wall 30. Arms 46 constitute part of retaining wall 44. When corralling utensil 40 is inserted into groove 26, the flexibility of arms 46 cause them to elastically bend backward, as shown in FIG. 3C. The concavity of retaining wall 44 forms a gathering area 48 that facilitates the gathering, forming of piles, and moving of cut food as corralling utensil 40 is pushed along a surface with cut food on it. FIG. 4B shows a side view of corralling utensil 40 inserted into groove 26 of cutting board 20.

Corralling utensil 40 should be made of a material that possesses elastic and flexible properties. I presently prefer it to be injection molded in a plastic that is safe for use with food products and able to be safely washed without affecting the integrity of the device, such as virgin polypropylene. It can be made in other ways with other materials, for example with flat stainless spring steel cut out from a pattern and configured to shape. Cutting Board 20 is made of a mostly rigid material. In the preferred embodiment it is made of wood or a plastic such as high-density polyethylene (HDPE) that is cut to form on a computer numerical controlled (CNC) machine. A lightweight wood, or light core HDPE, or similar lightweight material may be used, and/or the bottom of the board may be hollowed-out, to decrease the weight of the board. If the board is injection molded, a rigid, food-grade plastic should be used, such as virgin polypropylene, HDPE, or ABS. To increase the strength of the board, a rigid material may be attached on or inserted into parts of the board. For example, a flat piece of steel may be inserted into a corresponding space formed under groove 26 to provide more strength and rigidity to that area.

The size, shape, and configuration of corralling utensil 40 may vary, depending on factors such as intended use, intended users, the size and thickness of cutting board 20, the type and amount of food it will be used with, as well as manufacturing and aesthetic considerations. Wall thickness of corralling utensil 40 may vary, but should maintain sufficient integrity while providing enough elasticity and flexibility to facilitate the insertion, secure storage, and removal of corralling utensil 40 in and from cutting board 20. Corralling utensil 40 may rise above cutting board 20 when stored in groove 26, as shown in FIG. 4B, or the top of corralling utensil 40 may be flush with or lower than the top surface of cutting board 20. Preferably the length of corralling utensil 40 should approximate the width of cutting board 20. The size, shape, configuration, and thickness of cutting board 20 may also vary, for example handhold 23 may be more or less thick than the rest of the board, the bottom surface of handhold 23 may be raised, and the top surface of handhold 23 may be lower than cutting surface 21.

FIGS. 6A-6B2 show cutting board 20 of the present invention designed for injection molding, with a convex front end 24. The top edge of back groove wall 28 is chamfered 35 which provides means for gradual downward movement and therefore easier insertion of corralling utensil 40 into groove 26. Indents 36 on outer front groove walls 30A are tapered downward and inward which facilitate easier insertion of corralling utensil 40 into groove 26. The depth of indents 36 should be sufficient enough so that arms 46 of corralling utensil 40 clear the bottom of indents 36 when corralling utensil 40 is being inserted into groove 26 as described below, whereby the pushing back of arms 46 is more gradual during insertion, and therefore easier. A recessed bottom cutting surface 38 provides a cutting area surrounded on three sides by a barrier, or lip, extending along the perimeter of bottom cutting surface 38, except for front end 24, whereby cut food 60 and any juices resulting from cutting food remain inside this cutting area until removed, as shown in FIG. 6B. Bottom cutting surface 38 may be sloped so that juices flow down and backwards towards front groove wall 30 when bottom cutting surface 38 is facing upwards for use, after which the user may easily pour the juices out. Bottom cutting surface 38 may also have grooves, indents, or other means to help catch juices. Cutting surface 21 and/or bottom cutting surface 38 may be smooth to aid the gathering and moving of food across the surfaces, or may be pebbled or textured to help keep food in place there during the cutting process, or they may be a combination of smooth and textured to provide the benefits of each in a particular area of the surface. FIG. 6B2 shows an alternate version of the present invention, in use with a differently shaped corralling utensil 40 which is mostly flat. which fits into groove 26 and is removably secured there by pressure fit. Handle 41 comprises a protrusion extending from retaining wall 44. Bottom cutting surface 38 is facing upwards in this version, so as to become the top cutting surface.

FIGS. 6C-6F show side views of the present invention with various means for temporarily securing corralling utensil 40 within groove 26. Locking protrusion 33 is a small protrusion on back groove wall 28 that helps to removably secure corralling utensil 40 in groove 26 by providing a catch for furrow 43 to temporarily lock on, as shown in FIG. 6C. FIG. 6D shows cutting board 20 with a curved wall protrusion 32 on back groove wall 28, the curve generally matching the curve of furrow 43, which furrow 43 may temporarily lock into when corralling utensil 40 is inserted in groove 26. FIG. 6E shows a wall overhang 31 which extends outward from the top edge of front groove wall 30. Overhang 31 will help to temporarily lock corralling utensil 40 in place when it is inserted in groove 26, and may continue along or be solely on the outer front groove walls 30A. Overhang 31 will also prevent a knife from hitting retaining wall 44 while slicing on cutting surface 21. FIG. 6F shows magnets 34 placed within back groove wall 28 and within handgrip 42 of corralling utensil 40, whereby the magnetic attraction between the magnets 34 will help to secure corralling utensil 40 within groove 26 when inserted therein. Alternatively, ferrous material may be used in place of one of the magnets 34, or handgrip 42 may be made of a ferrous material. Similarly, a magnet 34 may be placed within front groove wall 30 and retaining wall 44 may have ferrous or magnetic material placed in or on it, or it may be made of a ferrous material.

FIG. 6G shows corralling utensil 40 with a protuberance 47 on handgrip 42. Protuberance 47 may take various forms, and extends outward from handgrip 42. Here it is shown as mostly oval, with rounded edges and a mostly flat front, but it may be shaped in many other ways, and multiple smaller protuberances may be used instead of one larger one. Protuberance 47 can be provided in many ways, for example it may be formed as part of handgrip 42, it may be made as a separate piece and attached to handgrip 42, or it may be formed by filling in furrow 43 with material until protuberance 47 is formed. It may be made of the same material as corralling utensil 40, or another material that may be more compressible, such as rubber. It may have letters or other designs engraved in it to provide extra friction, and may protrude by various lengths. Protuberance 47 may continue around the entire handle 41, if desired.

Protuberance 47 provides several benefits. For example, it can provide an area for better gripping of handle 41. This benefit, as well as the easy lifting of corralling utensil 40 out of groove 26, may be further promoted by providing other means for facilitating the gripping of handle 41, for example by placing a protuberance similar to protuberance 47 or a furrow similar to furrow 43 on the inner surface of handle 41, handgrip 42, or portions thereof. Protuberance 47 may provide easier insertion and more secure storage of corralling utensil 40 within groove 26, depending on its protrusion distance and the design of cutting board 20. Since protuberance 47 is rounded at its edges, it will easily slide into groove 26 when corralling utensil 40 is pushed downwards into groove 26, as described below. Protuberance 47 may have beveled edges instead of rounded ones, which would provide the same benefit. Because protuberance 47 extends outward from handgrip 42, it will contact back groove wall 28 and be the surface creating friction which secures corralling utensil 40 in groove 26. More friction, and therefore more secure storage will be created if protuberance 47 is made of a material that will create more friction than plastic, such as rubber, or is substantially textured, or has letters or other designs engraved within it. Cutting board 20 may have an indentation 51 provided in back groove wall 28 that closely matches the shape of protuberance 47, to help lock corralling utensil 40 in place in groove 26, as shown in FIG. 6H.

These and the other methods described herein for temporarily securing corralling utensil 40 on, in, or to cutting board 20 may be used by themselves or in conjunction with any other method described, as well as with any other appropriate method, such as adding texture or horizontal ridges to the outer surface of handgrip 42.

OPERATION

Preferred Embodiment—FIGS. 4A-5B

In operation one uses the corralling utensil 40 by grasping handle 41 and/or handgrip 42 and/or part of retaining wall 44 and pushing corralling utensil 40 generally forward along the surface of a cutting board or other surface so that cut food 60 thereon gathers substantially within gathering area 48, whereby cut food 60 can then be efficiently moved around or off the cutting board or other surface by continuing the forward movement of corralling utensil 40.

Figure 4A:
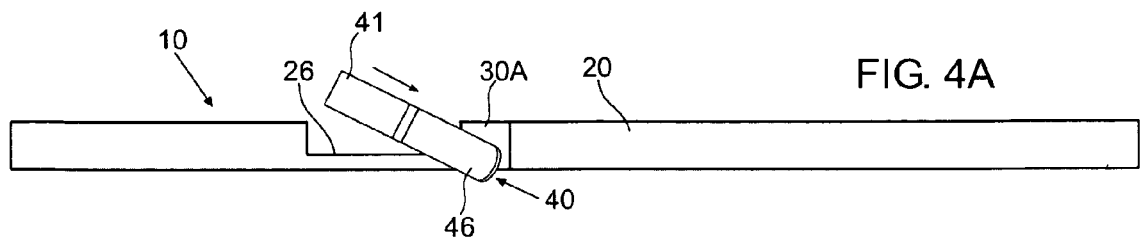
FIG. 4A shows a side view of the present invention illustrating the corralling utensil being inserted into the groove of the cutting board.
Figure 4B:
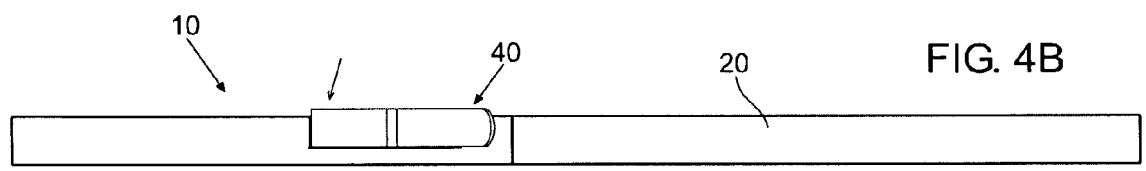
FIG. 4B shows a side view of the present invention, illustrating the corralling utensil removably secured in the groove of the cutting board.

As shown in FIGS. 4A and 4B, side views of the preferred embodiment, when using corralling utensil 40 with associated cutting board 20, the user first removably secures corralling utensil 40 in groove 26 on cutting board 20 by pressing corralling utensil 40 forward with the front angled downward into groove 26, as indicated by the arrow, which will cause arms 46 to flexibly bend backward as they are pushed against outer front groove wall 30A. As corralling utensil 40 is pushed forward into groove 26, the user gradually pushes generally downward on handle 41 as shown in FIG. 4B and indicated by the arrow, until corralling utensil 40 rests mostly flat inside groove 26. The user then releases corralling utensil 40, and the tension from the flexing of arms 46 presses corralling utensil 40 backward so that handgrip 42 is pressed firmly back against back groove wall 28, thereby tensionally and frictionally holding corralling utensil 40 firmly but removably in place within groove 26. Optional radius 27 or chamfer 35 on the top edge of back groove wall 28 will facilitate easier placement of corralling utensil 40 into groove 26 by making it easier to gradually push handle 41 down into groove 26. Other methods of insertion may be used, depending on user preference, for example by first inserting one side of corralling utensil 40 into groove 26, then pressing down on the other side, to secure corralling utensil 40 in place.

Figure 5A:
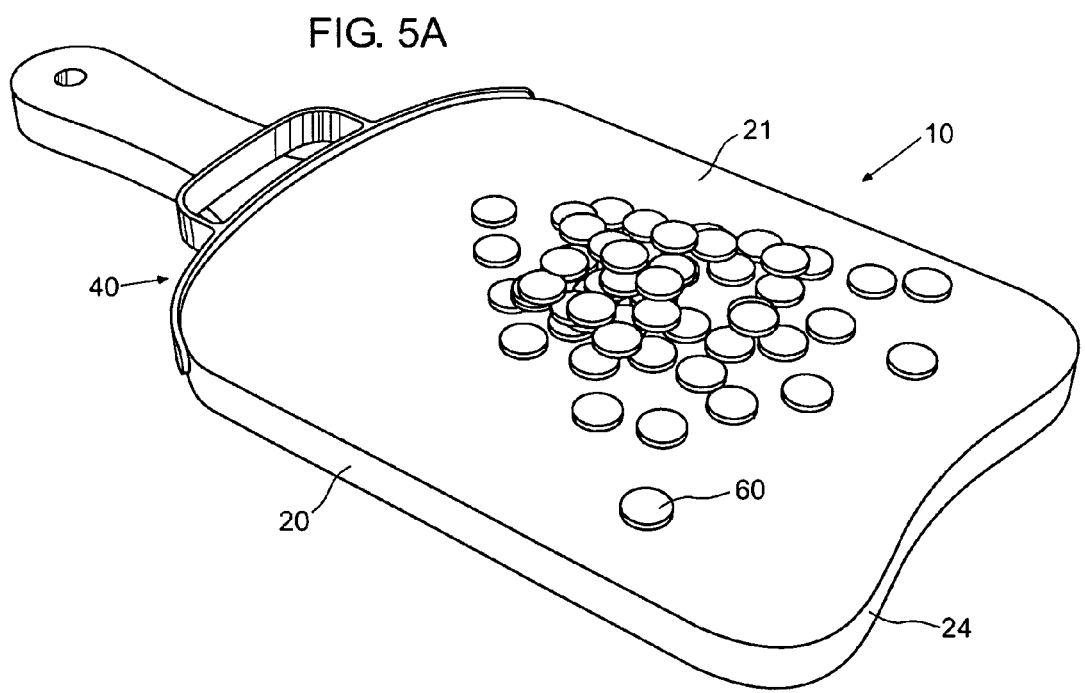
FIG. 5A shows the present invention with cut food on the cutting board.

The user then proceeds to use cutting board 20 as they normally would, using a knife or other sharp instrument to cut articles of food on cutting surface 21 of board 20, typically resulting in cut food 60 scattered on cutting surface 21, as shown in FIG. 5A. When the user desires to move cut food 60 around or off cutting board 20, for example to transfer the food into a sink, colander, pot, dish, storage container, or other location, the user picks up cutting board 20 by its handhold 23, or at any other convenient location, and brings it into proximity of the location for transfer of the food, here shown as container 64. Corralling utensil 40 is then removed from groove 26 by lifting it upwards or pulling it out sideways. The sliced, chopped, or cut food 60 is then guided around and transferred from cutting board 20 by pushing corralling utensil 40 generally forward along the surface 21 of cutting board 20 so that cut food 60 substantially gathers within gathering area 48 of corralling utensil 40. Corralling utensil 40 is then pushed further along surface 21 towards the end or a side of cutting board 20, whereby cut food 60 is pushed off cutting board 20 into container 64, as shown in FIG. 5B. Cutting board 20 may be flipped over so that the underside of cutting surface 21 may be used in a similar fashion as described above. When the user is finished, they may reinsert corralling utensil 40 into cutting board 20, as described above, for later use. When the user is finished with their food preparation, cutting board 20 and corralling utensil 40 can be cleaned by hand or in a dishwasher, depending on the materials used to make each part, and may be stored together or separately.

The user may rotate corralling utensil 40 while moving it generally forward, which will help focus the cut food 60 for more accurate moving, for example if pushing cut food 60 into a small container 64, as shown in top view FIG. 5C. By containing cut food 60 within corralling area 48, the present invention facilitates faster, easier, safer, and more accurate movement of cut food around and off cutting board 20. In the preferred embodiment, both sides of cutting board 20 may be used, and both sides of corralling utensil 40 may be used. Corralling utensil 40 may be picked-up and used from wherever it happens to be placed down, for example on a counter or table, and may be used without cutting board 20, on other surfaces such as butcher blocks, chopping mats, and other cutting boards. Corralling utensil 40 can also be used to push food onto a knife in order to carry the food to another location, and may be removed from cutting board 20 while cutting or otherwise preparing food. Hanging hole 22 is provided for those users who wish to hang the present invention on a hook or other device.

The injection-molded board shown in FIGS. 6A-6B is used in a similar manner. FIG. 6B shows the present invention 10 being used upside down, showing how the user may insert corralling utensil 40 into the area formed on and around surface 38 after food has been cut there, then push corralling utensil 40 generally forward in the direction of the arrow to gather and guide cut food 60 along surface 38 and off front end 24. Using the present invention in this way provides the benefit of further preventing cut food 60 from falling off board 20, because the food is contained within the cutting area until removed. Cutting board 20 shown in FIGS. 6A-6B has a handhold 23 whose bottom surface is raised, so that a user may more easily slide their fingers underneath handhold 23 when lifting cutting board 20. Retaining wall 44 and arms 46 of corralling utensil 40 need not be curved or horizontally bent inwards, but instead may be straight or mostly straight. In this configuration, the side walls of cutting board 20 will act in concert with retaining wall 44 to form a gathering area 48. This is shown in FIG. 6B2 which shows how the user may insert corralling utensil 40 into the area formed on and around surface 38 after food has been cut there, then push corralling utensil 40 generally forward in the direction of the arrow to gather and guide cut food 60 along surface 38 and off front end 24.

The above description should not be construed as the invention's only configuration, form, or use. There are various possibilities with regard to the corralling utensil, the cutting board, their use alone and together, as well as their interaction with each other and the user, while still generally maintaining the advantages of the preferred embodiment. For example, corralling utensil 40 can be made without a handle, or with a differently shaped handle. It can be used on its own on surfaces other than cutting board 20, and be made with arms 46 that do not flex. Cutting board 20 can be made in many shapes, configurations, and sizes, and be made with differently shaped and configured grooves in various locations on the board.

Referring now to FIGS. 7A-8D, alternative embodiments of the present invention will be described in detail. These embodiments are substantially similar to the preferred embodiment disclosed above, with slight modifications as described.

DESCRIPTION

Alternative Embodiment A—FIG. 7A

FIG. 7A shows a perspective view of Alternative Embodiment A 10-A constructed in accordance with the present invention, with a corralling utensil 40 that uses the flexibility and elasticity of its handle 41 and/or handgrip 42, which compress inward when pressed, for securing itself into groove 26, which is shaped appropriately for the insertion of this particular corralling utensil 40. Although the corralling utensil 40 of the preferred embodiment may also perform in this manner, the shape of handle 41 in embodiment 10-A more easily facilitates this action. The corralling utensil 40 shown in FIG. 6G may also be used in this embodiment, whereby protuberance 47, if made from an elastic material, can provide the necessary elasticity to secure corralling utensil 40 into groove 26. A combination of the above may also be used, and additional means may be used to facilitate the function of this embodiment, for example handle 41 may be fully or partially covered with a material that has elastic properties, such as silicone or rubber. Since handle 41 provides means for securing corralling utensil 40 within groove 26, utensil 40 may be made so that arms 46 do not bend backward, if desired.

The distance between the outer surface of handgrip 42 or protuberance 47 if used, and the outer surface of retaining wall 44 in this embodiment is the same or more than the distance between back groove wall 28 and front groove wall 30, to allow the securing of corralling utensil 40 into groove 26. Corralling utensil 40, handle 41, and/or groove 26 may be shaped differently than shown here.

OPERATION

Alternative Embodiment A—FIG. 7A

Alternative Embodiment A 10-A is used in a similar manner as the preferred embodiment, described above. However, when securing corralling utensil 40 in groove 26, the user pushes in on handle 41 and/or protuberance 47, which flexes inward while corralling utensil 40 is being pushed into groove 26, as described in the preferred embodiment, releasing handle 41 when corralling utensil is mostly flat within groove 26, whereby the pressure created by the spring-back of handle 41 and/or protuberance 47 creates tension and friction sufficient to secure corralling utensil 40 within groove 26. Corralling utensil 40 is removed for use by pulling it out of groove 26, or by pushing handle 41 and/or protuberance 47 inward, then pulling out corralling utensil 40.

DESCRIPTION

Alternative Embodiment B—FIG. 7B

FIG. 7B illustrates Alternative Embodiment-B 10B constructed in accordance with the present invention, where board 20 does not have a handhold as described in the preferred embodiment, and groove 26 is formed within board 20. Groove 26 may vary in depth, and may continue completely through board 20, which will make the use of the underside of the device as easy to use as the top side. Groove 26 may be shaped differently than that shown in order to more easily facilitate the insertion and removal of corralling utensil 40, for example with a cutout for insertion of fingers. Additionally, if in this embodiment groove 26 does not go all the way through board 20, corralling utensil 40 may be made so that arms 46 do not bend inwards; instead retaining wall 44 and arms 46 may be made to follow the same general curve as groove 26. In this case, gravity alone is used to hold corralling utensil 40 in place in groove 26. Alternatively, corralling utensil 40 may be made so that it stays in groove 26 via pressure fit or other means.

OPERATION

Alternative Embodiment B—FIG. 7B

Alternative Embodiment-B 10B works similarly to the preferred embodiment of the present invention, as described above, except the user would grasp board 20 along one of its edges to hold the board during use.

DESCRIPTION

Alternative Embodiment C—FIG. 7C

FIG. 7C shows Alternative Embodiment C 10-C constructed in accordance with the present invention, where cutting board 20 does not have a handhold as described in the preferred embodiment, and has a groove 26 underneath cutting board 20 for the temporary storage of corralling utensil 40. This version has a hollowed-out bottom with ribs that form groove 26. Embodiment C 10-C also has a gripping recess 39 formed on each end of board 20, for the user to slide one or both hands under during use, to more easily grasp the board.

OPERATION

Alternative Embodiment C—FIG. 7C

Alternative Embodiment-C 10C works similarly to the preferred embodiment of the present invention, as described above, except the user would grasp board 20 at one of the gripping recesses 39 of board 20 during use, and reach underneath board 20 to access corralling utensil 40.

DESCRIPTION

Alternative Embodiment D—FIG. 7D

FIG. 7D shows Alternative Embodiment D 10-D constructed in accordance with the present invention, where board 20 does not have a handhold as described in the preferred embodiment, and magnets are inserted into an end of cutting board 20 for the temporary securing of corralling utensil 40. Magnets 34 are embedded in one side of board 20 to attract and removably attach corralling utensil 40, whose retaining wall 44 is either made of a ferrous material or has a ferrous or magnetic material embedded within or on it. This version of corralling utensil 40 has an alternate handle 49 that is a single protrusion from the back of retaining wall 44, and is an example of one of the many shapes and configurations that corralling utensil 40 may take. It shows an optional dimple 50 which facilitates better grasping of handle 49.

OPERATION

Alternative Embodiment D—FIG. 7D

Alternative Embodiment-D 10D works similarly to the preferred embodiment of the present invention, as described above except the user attaches and removes corralling utensil 40 by pushing it onto and pulling it off of magnets 34, respectively.

DESCRIPTION

Alternative Embodiment E—FIGS. 8A-8D

FIG. 8A shows Alternative Embodiment E 10-E constructed in accordance with the present invention, where board 20 does not have a handhold as described in the preferred embodiment. Groove 26 may be designed to accommodate corralling utensils 40 that may have different shapes and configurations, by providing two separate back groove walls 28. For example, FIG. 8A shows board 20 accommodating the corralling utensil 40 as described in the preferred embodiment. Corralling utensil 40 may be made without handle 41 as described in the preferred embodiment, instead having other means that serve as a handle for the user to grasp during use. For example, FIG. 8B shows board 20 accommodating a corralling utensil 40 with vertically extended retaining wall 44 which the user may grasp during use. FIG. 8C shows arms 46 being generally straight and extended outward, upon which the user may grasp for moving corralling utensil 40. FIG. 8C also shows retaining wall 44 being mostly straight, as well as back groove wall 28 being a single wall.

Cutting board 20 in this embodiment has a gripping recess 39 on each side for the user to slide one or both hands under to better grasp the board during use. Other means to facilitate a good grip on cutting board 20 may be provided, for example thumb grooves 39A may be placed above the gripping recesses 39 for the placement of the user's thumb while holding the board there, as shown in FIG. 8B, and a ledge may be provided that protrudes from a part of cutting board 20 that the user may grasp during use in place of a handle. Also shown in FIG. 8B, back groove wall 28 and/or front groove wall 30, or portions thereof, may tilt outwards, be beveled, textured, or otherwise shaped or provided with means to help facilitate the easy and secure insertion and storage of corralling utensil 40 within groove 26. For example, back groove wall 28 may rise above cutting surface 21, which makes it easier to insert corralling utensil into groove 26. Additionally, in this embodiment, corralling utensil 40 may be made so that arms 46 do not necessarily bend backwards; instead retaining wall 44 and arms 46 are made to follow the same general curvature as front groove wall 30, in which case gravity and/or friction holds corralling utensil 40 in place in groove 26. According to this embodiment of the present invention, cutting board 20 is substantially rectangular in shape. However, cutting board 20 in this and any other embodiment can be any organic or geometric shape, such as hexagonal, octagonal, circular, oval, triangular, rhomboidal, etc.

OPERATION

Alternative Embodiment E—FIG. 8D

Alternative Embodiment-E 10E works similarly to the preferred embodiment of the present invention, as described above, except the user would grasp board 20 along one of the edges of the board during use, for example at gripping recess 39, where the user's thumb may rest in thumb groove 39A. Corralling utensil 40 is placed into groove 26 by placing one arm 46 of utensil 40 into one end of groove 26, then bending utensil 40 inward to place the other arm 46 into the other end of groove 26, and pressing utensil 40 downwards until it is secured therein. If retaining wall 44 and arms 46 have the same curvature as front groove wall 30, corralling utensil 40 is simply pushed down into groove 26. To remove utensil 40, the user grasps handle 41, or retaining wall 44, arm 46, or anywhere else on utensil 40 depending on the design of utensil 40 and what feels comfortable to the user, then pulls utensil 40 upwards out of groove 26 and uses it as described above in the preferred embodiment. FIGS. 8C and 8D show embodiment E 10E in use, with utensil 40 gathering and moving cut food 60.

ADVANTAGES

From the description above, a number of advantages of my corralling utensil and associated cutting board become evident:

(a) The present invention facilitates faster and easier food preparation by providing an area for accurate and efficient gathering and moving of piles of cut food around and off the cutting board and other surfaces. It allows users to aim and focus cut food into containers such as cooking pots, dishes, storage containers, etc. by rotating the corralling utensil while pushing it forward. This is especially advantageous when the container is smaller than the width of the cutting board. The flat bottom edge of the corralling utensil will scrape and move food more efficiently and effectively than the curved edges of a kitchen knife.

(b) The present invention facilitates cleaner food preparation by helping to prevent pieces of cut food from inadvertently falling off a cutting surface onto the floor, stove, etc. when the user is moving food from a cutting surface to a container. It saves the user time and energy otherwise needed for cleaning up wayward food, it keeps the kitchen more sanitary, and it saves the user money through less food waste and need for cleaning materials, which also benefit the environment.

(c) The present invention facilitates cleaner, safer and more pleasant food preparation by providing a handle on the corralling utensil for users to hold during use, which helps keep the user's hands clean by letting them avoid touching cut food. This helps them avoid bacterial contamination from foods such as raw meats and seafood, and prevents strong odors and skin irritants from foods such as onion, garlic, and pepper from getting on their hands or fingers. Additionally, by facilitating faster preparation of foods such as onions, the user has less exposure to the eye irritants contained therein;

(d) The present invention allows the user to push food off the sides, front, back, or corners of a cutting board, it allows users to move a single pile when more than one is on the board, as well as move partial piles of food if desired. Juices and residue are also effectively pushed off the board. The corralling utensil may also act as a retaining wall and splash guard when inserted in the board;

(e) The present invention can be used effectively by right-handed and left-handed users. It is easy to use, easy to learn how to use, and the design of the corralling utensil keeps it in a ready-to-use position. It is easily cleaned by hand or in a dishwasher, depending on the materials used for production of the various parts;

(f) The corralling utensil can be stored within the cutting board when not in use, thereby being less likely to get lost or misplaced, and is in a convenient location when needed for use, therefore providing fast access to it during food preparation. The corralling utensil can be used effectively right-side up or upside-down, and therefore may be stored in the cutting board either way;

(g) The corralling utensil can be sold without the cutting board for use on its own with other cutting boards and surfaces, for example with butcher blocks and chopping mats, or to clean-up food that has spilled on a table, counter, or floor. The cutting board can also be used on its own, without the corralling utensil;

CONCLUSION, RAMIFICATIONS, AND SCOPE

Accordingly the reader will see that, according to the present invention, I have provided a corralling utensil and associated cutting board that allows the user to cut food items as easily as usual, then accurately guide the piles of cut food around and off the cutting board. Furthermore, the present invention has the additional advantages that:

Various methods may be implemented to make the present invention and any embodiment thereof easier for the user to grip and use. For example, handgrip 42 and handhold 23 can be textured, ridged, grooved, coated, over-molded, filled-in, engraved, have finger indents, etc. to improve the grip. Furrow 43 may be partially or fully filled in, or coated with various materials, such as rubber, plastic, or silicone. Additionally, handgrip 42 and handhold 23 may be designed to be more ergonomic, or accommodate various sizes of fingers and hands, for example by making them thinner or rounder;

The corralling utensil can be made wholly or partially of various materials, such as plastic, wood, composites, rubber, glass, or metal. For example, the retaining wall 44 can be made of stainless steel, attached to a plastic handle 41. If the corralling utensil is not intended to be used with an associated cutting board, it may be made of non-elastic materials if desired;

The corralling utensil can be coated with PTFE or other non-stick coatings, as well as other coatings to provide various benefits, for example to make it slide more easily along surfaces. It can be made from a material that resists sticking, such as HDPE or polypropylene. The retaining wall can also be appropriately shaped, textured, or scalloped to reduce the likelihood of food sticking to it;

The corralling utensil may be sized and shaped in various ways, such as with a larger or smaller handle, shorter or longer retaining wall, etc. The top side of the corralling utensil may be made not flat, for example it can be curved or have protrusions. The top or bottom may be textured, ridged, grooved, etc. to provide more scraping ability, which may be useful for cleaning surfaces. The corralling utensil may be made without a distinct handle, and still prove effective for its intended use, as may the cutting board;

The retaining wall 44 on the corralling utensil may be shaped in various ways, such as in a "V" shape, with areas of straight and curved sections, with tapered arms, or in a tighter or looser curve. A tighter curve would provide a tighter fit inside groove 26, and provide more focusing of food being moved. Alternatively, the user may squeeze corralling utensil 40 between handgrip 42 and retaining wall 44 during use, which will bring arms 46 closer together. Other designs may be utilized to provide better food gathering and moving ability, for example the retaining wall and arms may, from a side view, have a vertically curved, concave, or angled shape;

The cutting board may have its top surface be mostly flat, with the bottom of the board not flat, for example being concave or hollowed out, or having "feet" or other extensions protruding from the bottom of the cutting board to provide anti-slip characteristics, elevate the cutting board above a countertop, and provide support for the cutting board during the cutting process. Similarly, parts of the board may be designed and/or textured in a manner that provides anti-slip characteristics. The top surface of handhold 23 may be lower than cutting surface 21, or tapered downward towards groove 26, to facilitate easier insertion of corralling utensil 40 in groove 26. The cutting board can be made wholly or partially of various materials, such as wood, metal, plastic, and/or silicone, for example with a wood cutting surface, a plastic handle and a metal groove;

Groove 26 may be made so that it holds the retaining wall and/or arms only, or only the handle, of the corralling utensil. The outer front groove wall 30A may be notched to catch the outer ends of the arms of the corralling utensil;

The corralling utensil can be temporarily held in place within groove 26 by means other than those described herein, for example with Velcro, suction cups, clips, or other means. The corralling utensil, groove, or cutting board may be designed so that the corralling utensil is more securely held in the groove, for example by utilizing a ball catch or other mechanical device;

The present invention can be used to corral things other than food, such as kitchen waste, hardware items such as nails, home items such as pills, and office items such as thumbtacks.

While the above description contains many specificities, these should not be construed as limitations on the scope of the invention, but as exemplifications of the presently preferred embodiments thereof. Many other ramifications and variations are possible within the teachings of the invention. Thus the scope of the invention should be determined by the appended claims and their legal equivalents, and not by the examples given.

What is claimed is:

1. A freely movable corralling utensil in combination with a cutting board having a handle portion, for gathering and moving items on a surface of said cutting board, said corralling utensil comprising:
    (a) at least one retaining wall, said retaining wall having at least one horizontally inwardly bent portion, said inwardly bent portion forming a gathering area within said inwardly bent portion;
    (b) gripping means, comprising a u-shaped handle attached to the retaining wall on a side opposite of the inwardly bent portion, protruding from said retaining wall for grasping said corralling utensil;
    (c) at least one portion of said retaining wall having elastic properties, whereby said retaining wall may be deformed during use to change the shape of said gathering area; and
    (d) means for temporarily attaching said corralling to said cutting board within at least one indent located in the handle portion of the cutting board.

2. The corralling utensil of claim 1, wherein at least one portion of said handle has elastic properties.

3. The corralling utensil of claim 1, wherein said gripping means comprises a U-shaped handle attached to said retaining wall.

4. The corralling utensil of claim 1, wherein said gripping means comprises at least one protrusion from said retaining wall.

5. A corralling utensil with an associated cutting board, said corralling utensil comprising:
    (a) at least one retaining wall;
    (b) grasping means for holding and moving said corralling utensil;
    (c) said cutting board comprising at least one surface for cutting articles thereon;
    (d) said cutting board further comprising means for removably securing said corralling utensil to said cutting board;
    (e) whereby said corralling utensil may be secured to and removed from said cutting board, whereby said corralling utensil may be freely moved on said cutting board, whereby items on said cutting board are substantially gathered, and may be transferred to another location; and
    (f) wherein said means for removably securing said corralling utensil to said cutting board further comprises at least one indent located in a handle portion of the cutting board.

6. The cutting board of claim 5, further comprising a lip extending along the perimeter of at least three sides of said cutting board.

7. The cutting board of claim 5, further comprising a protrusion for the removable securing of said corralling utensil.

8. A method for gathering and moving one or more items on a cutting board, the method comprising:
    a) providing said cutting board, with handle and a removably secured corralling utensil for said gathering and moving, said corralling utensil comprising at least one retaining wall, and said corralling utensil further comprising grasping means for holding and moving said corralling utensil;
    b) providing said cutting board handle with at least one indent;
    c) removing and attaching said corralling utensil from said cutting board handle indent;
    d) holding said corralling utensil and moving said corralling utensil along said cutting board whereby said one or more items on said cutting board are substantially gathered and moved along said cutting board by said corralling utensil.

9. The method of claim 8, wherein said retaining wall of said corralling utensil has at least one horizontally inwardly bent portion, said inwardly bent portion forming a gathering area within said inwardly bent portion.

* * * * *